United States Patent [19]

Teske

[11] 4,320,828
[45] Mar. 23, 1982

[54] ARM-TYPE FEEDER WHEEL FOR UNLOADING SOLIDS FROM A BIN

[76] Inventor: Lothar Teske, Hegelstr. 15, 5000 Cologne 90, Fed. Rep. of Germany

[21] Appl. No.: 156,609

[22] Filed: Jun. 5, 1980

[30] Foreign Application Priority Data

Sep. 21, 1979 [DE] Fed. Rep. of Germany ....... 2938165

[51] Int. Cl.³ ............................................. B65G 29/00
[52] U.S. Cl. ..................................... 198/803; 198/616; 414/325
[58] Field of Search ............... 198/518, 558, 616, 642, 198/692–693, 722–723, 803; 414/325; 299/91; 172/556, 548

[56] References Cited

U.S. PATENT DOCUMENTS 963,716  7/1910  Kramer .............................. 172/556

FOREIGN PATENT DOCUMENTS 1117494 11/1961 Fed. Rep. of Germany ...... 414/325
2115354 11/1971 Fed. Rep. of Germany ...... 198/722

Primary Examiner—Joseph E. Valenza
Assistant Examiner—Paul A. Sobel
Attorney, Agent, or Firm—Karl F. Ross

[57] ABSTRACT

A feeder wheel has a hub disk which is centered on and rotatable about an axis, which has a pair of axially oppositely directed faces, and which is formed with a plurality of radially outwardly open, substantially angularly equispaced, and axially throughgoing notches each having a pair of generally radially extending and angularly spaced edges each stepped at a shoulder. Respective feeder arms each having an outer end projecting radially from the disk at the respective notch and an inner end received in the respective notch are each formed with a pair of angularly oppositely projecting flanges engaged axially on the respective shoulders. Fastener bolts extend through the disk and arms at the flanges and shoulders for securing the arms on the disk.

10 Claims, 3 Drawing Figures

ARM-TYPE FEEDER WHEEL FOR UNLOADING SOLIDS FROM A BIN

FIELD OF THE INVENTION

The present invention relates to an arm-type feeder wheel for unloading solids from a storage bin.

BACKGROUND OF THE INVENTION

It is known to provide a solids-storage bin adjacent its lower end with a laterally open slot. A feeder wheel having a plurality of radially extending arms is rotated about a vertical axis adjacent this outlet opening so that the orbits of the arms extend into the bin through the opening. As it rotates such a feeder wheel therefore unloads solids from the bin by entraining them laterally outwardly through the outlet.

As the arms of such a feeder wheel are exposed to considerable abrasion it is necessary to be able to replace them periodically. To this end the wheel has a hub formed with a plurality of radially inwardly flaring seats in which the inner ends of the arms are received. Keys are wedged between these inner ends and the inwardly diverging edges of these seats to hold the arms tightly in place.

Such an arrangement makes it still relatively difficult to change the arms of the feeder wheel. In addition the wedges which must be driven radially outwardly to tighten the respective arms are relatively difficult to place properly and can even loosen during use of the device.

Another disadvantage of the standard type wheel described above is that solids can collect under the hub body, leading to eventual breakdown. This is due to the fact that the hub extends beyond the arms toward the table surface of the bin it is normally juxtaposed with, so that this material can get between the table and the hub.

OBJECTS OF THE INVENTION

It is therefore an object of the present invention to provide an improved feeder wheel of the above-described general type.

It is another object of the invention to provide such a feeder wheel whose arms can be securely mounted in place with relative ease, yet which will not loosen in service and which can be removed relatively easily.

A further object is to provide such a feeder wheel in which material cannot readily enter between the hub and a table underneath the wheel.

SUMMARY OF THE INVENTION

These objects are attained according to the instant invention in a feeder wheel having a hub disk centered on and rotatable about an axis, having a pair of axially oppositely directed faces, and formed with a plurality of radially outwardly open, substantially angularly equispaced, and axially throughgoing notches each having a pair of generally radially extending and angularly spaced edges each stepped at a shoulder. The feeder arms each have an outer end projecting radially from the disk at the respective notch and an inner end received in the respective notch and each formed with a pair of angularly oppositely projecting flanges engaging axially on the respective shoulders. Fasteners, normally in the form of nuts and bolts, extend through holes in the flanges and disk at the flanges and shoulders for securing the arms on the disk.

According to this invention the disk has a hub projecting at the axis axially from one of the faces and the inner and outer ends of the arms project axially beyond the other face of the disk. Thus with the system according to the instant invention the inner ends fit with modest play in the respective wheel notches so that during operation of the device force transmission is angular between the outer portion of the trailing edge of each notch and the inner portion of the leading edge of each notch relative to the normal direction of rotation of the wheel. The fasteners are received with some play in the respective holes so that they are subject to no shear force whatsoever, and merely serve to hold the arms axially on the wheel.

According to further features of this invention each edge of each notch has an inner portion and an outer portion and at least one intermediate portion. The inner portions of each notch are parallel to each other as are the outer portions. The intermediate portions are spaced angularly further apart than the outer portions so that the inner end of the respective arm will bear as described above on the leading inner portion and trailing outer portion.

In accordance with yet another feature the inner portions are substantially more closely spaced than the outer portions and are connected via second intermediate portions to the first-mentioned intermediate portions. These second intermediate portions are inclined to the respective inner and outer portions and connect the respective inner portion to the respective first intermediate portion. These second intermediate portions extend at an angle of between 45° and 75° to each other.

With the system according to the instant invention it is therefore relatively easy to take off worn feeder arms and replace them with new ones. One need merely unscrew the bolts holding the arms on, and then lift them axially out of the respective notches. Even if the arms have been in place a long time, the parts will not be frozen together so tightly that they will be difficult to separate, as the fasteners are effective purely axially whereas the principal forces are angular. At the same time extremely good force transmission is effected directly between the arm and the disk. The fastener bolts are not loaded in shear at all, but purely in axial tension, so that their service life can also be expected to be quite long.

SPECIFIC DESCRIPTION

Figure 1:
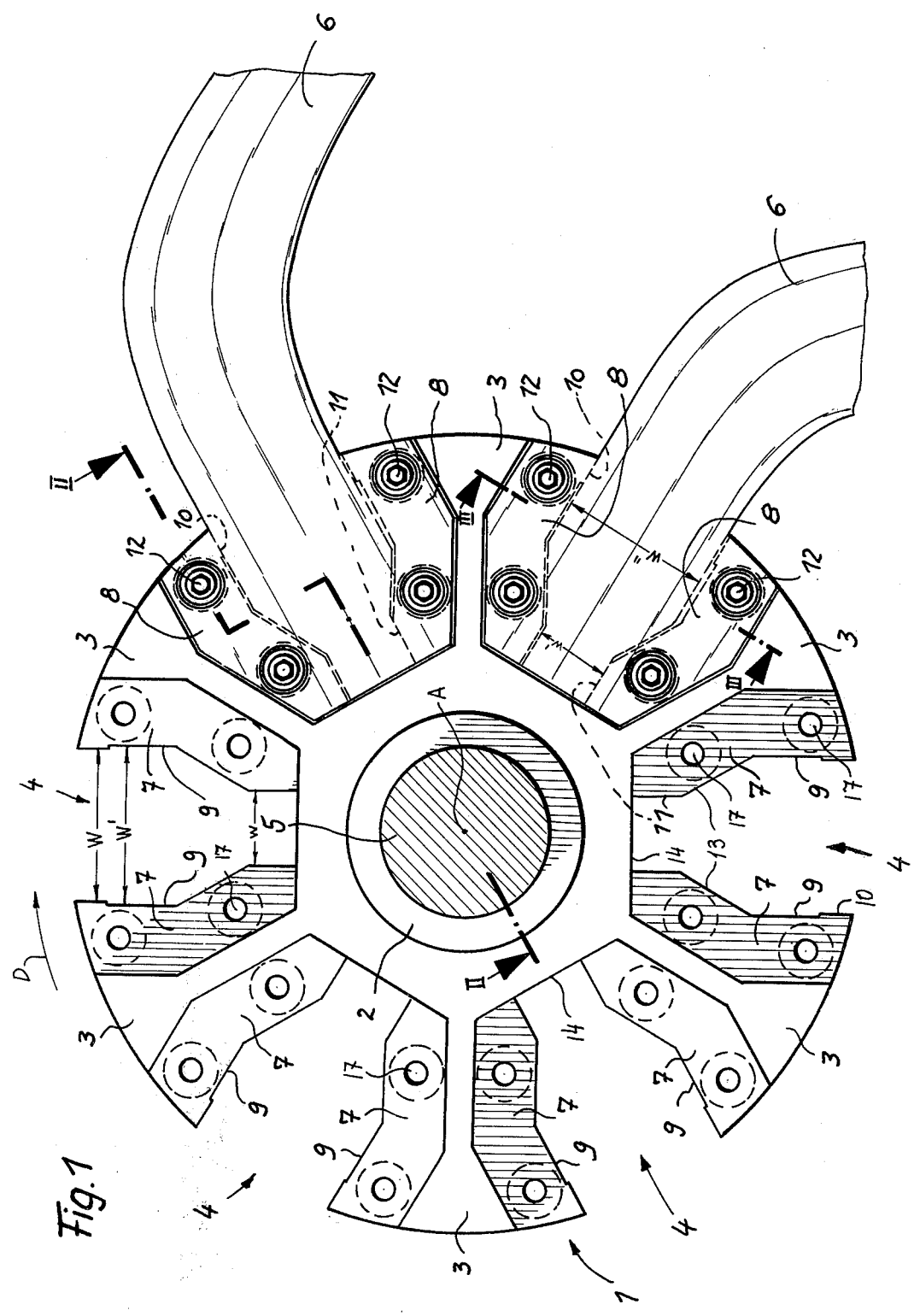
FIG. 1 is a top partly sectional view showing a feeder wheel according to this invention with some of the arms removed to clarify the view.

A feeder wheel 1 according to the instant invention is centered on an axis A and has a hub 2 formed unitarily with a hub disk 3 having an upper planar axial face 3a and a lower planar axial face 3b both perpendicular to the axis A. This disk 3 is formed with six angularly equispaced, axially throughgoing, and identical notches 4. The hub 2 and disk 3 are mounted on a motor shaft 5 for rotation about the axis A in a direction indicated at D in FIG. 1. Six identical feeder arms 6 each have inner ends received in the notches 4 and are arranged so that they normally enter a slot shown schematically at 15 in FIG. 2 of a solids-storage bin. A planar table 16 is provided immediately below the wheel 1.

Each of the notches 4 has a pair of edges each formed with a step 7 on which sits a flange 8 of the respective arm 6. The edges of the notches 4 are each subdivided into an inner portion 11, an outer portion 10, a first intermediate portion 9, and a second intermediate portion 13. The outer portions 10 of each notch 4 are parallel to an imaginary radius bisecting the respective notch 4 and are spaced apart by a distance W. Similarly the first intermediate portions 9 are parallel to a radius passing through the center of the respective notch 4, but are spaced apart by a distance W' which is slightly greater than the distance W. The inner portions 11 are similarly parallel but are spaced apart by a relatively short distance w equal to approximately half of the distance W. Thus the second intermediate portions 13 are inclined to the other portions and each connect the respective inner portion 11 to the respective first intermediate portion 9.

Disregarding the flanges 8, the arms 6 are each formed at their inner ends with a width W" which is slightly less than the width W and at their inner ends with a width w' which is slightly less than the width w. Between the region of width W" and the region of w' the inner end of the arm 6 tapers at an angle of 60° identical to that defined by the second intermediate portions 13. The extreme inner end of each arm 6 is spaced slightly radially outwardly from the corresponding inner end 14 of the respective notch 4.

The disk 3 is formed at each of the shoulders 7 with a pair of throughgoing holes 17 that align with corresponding holes 18 formed in the flange 8 of the respective arm 6. These holes 17 and 18 are counterbored so that a bolt 12 with a nut 19 can be fitted in them to hold the respective arm 6 in place while lying below the respective faces 3a and 3b. Otherwise the arm 6 extends axially below the face 3b by a distance d equal to slightly more than one-half of the overall axial thickness of the disk 3.

Figure 2:
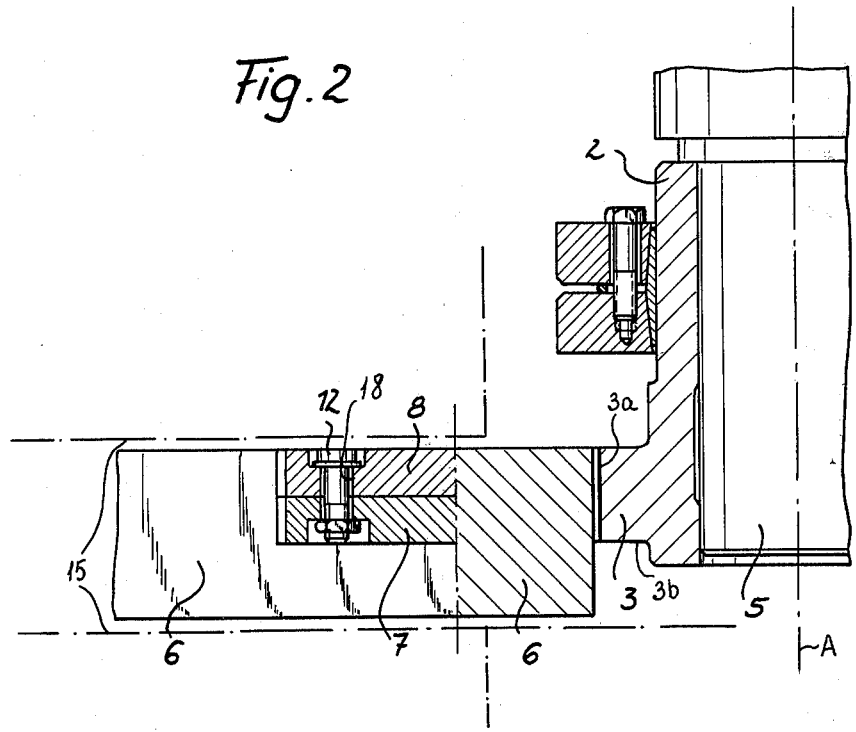
FIGS. 2 and 3 are sections taken along lines II—II and III—III, respectively, of FIG. 1.
Figure 3:
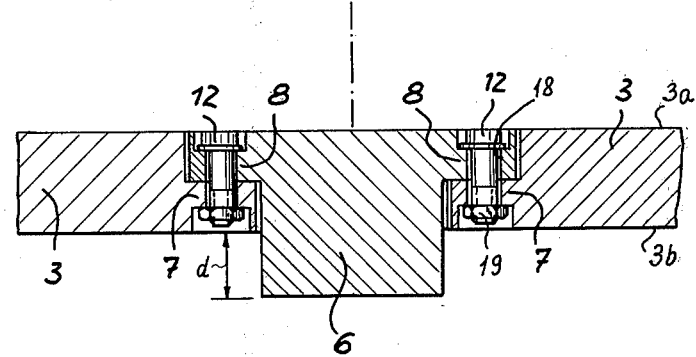

With the system according to the instant invention, therefore, the arms 6 can be relatively easily fitted into the respective notches 4 and can be relatively easily secured in place by means of the bolts 12. As the inner ends of the arms 6 fit with slight play within the respective notches 4 they can be made with relatively low tolerances to keep manufacturing costs down. Nonetheless once angularly stressed each arm 6 will bear tightly against the inner portion 11 of the leading edge and the outer portion 10 of the respective trailing edge relative to the direction D as is apparent from FIG. 1. The holes 17 and 18 are sufficiently large to allow this slight canting so that the bolts 12 are not stressed in shear at all. Since, as shown in FIGS. 2 and 6, the arms 6 extend axially downwardly by the distance d below the face 3b, to a position immediately above the upper edge of the slot 15 in the upper surface of the table 16, these arms 6 will keep the area underneath the hub disk 3 relatively clean. No solid material entering into this area will come into contact with the disk 3, as the material will be swept away by the arms 6. Each of the arms 6 is of square section and is approximately four times as thick as its flanges 8.

I claim:
1. A feeder wheel comprising:
 a hub disk centered on and rotatable about an axis, having a pair of axially oppositely directed faces, and formed with a plurality of radially outwardly open, substantially angularly equispaced, and axially throughgoing notches each having a pair of generally radially extending and angularly spaced edges each stepped at a shoulder;
 respective feeder arms each having an outer end projecting radially from said disk at the respective notch and an inner end received in the respective notch and each formed with a pair of angularly oppositely projecting flanges engaging axially the respective shoulders; and
 fasteners extending through said disk and arms at said flanges and shoulders for securing said arms on said disk.
2. The wheel defined in claim 1 wherein said disk has a hub projecting at said axis axially from one of said faces, said inner and outer ends of said arms projecting axially beyond the other face of said disk.
3. The wheel defined in claim 2 wherein said inner and outer ends of said arms are generally flush with said one faces of said disk.
4. The wheel defined in claim 2 wherein said inner ends are of T-section.
5. The wheel defined in claim 2 wherein each of said edges has an inner portion, an outer portion, and at least one intermediate portion, said intermediate portions offset angularly outwardly from the respective outer portions, whereby said arms each bear angularly on said disk at one of the respective outer portions and the opposite respective inner portion.
6. The wheel defined in claim 5 wherein each of said edges further has a second intermediate portion between the respective first-mentioned intermediate portion and the respective inner portion, said outer portions of each notch being substantially parallel and radial, said inner portions of each notch being substantially parallel and radial and being angularly more closely spaced than the respective outer portions, said first itnermediate portions of each notch being substantially parallel and radial and being angularly more widely spaced than the respective outer and inner portions, and said second intermediate portions being inclined to and extending between the respective first intermediate and inner portions.
7. The wheel defined in claim 6 wherein said second intermediate portions of each notch extend at an angle of about 60° to each other.
8. The wheel defined in claim 1 wherein each of said fasteners is a nut and bolt.
9. The wheel defined in claim 8 wherein said disk is formed at said step and said arms are formed at said flanges with alignable throughgoing holes loosely receiving said bolts.
10. The wheel defined in claim 9 wherein said holes are counterbored so that said bolts and nuts do not extend axially beyond said faces.

* * * * *